United States Patent
Zhang et al.

(10) Patent No.: US 12,474,712 B2
(45) Date of Patent: Nov. 18, 2025

(54) UNOBTRUSIVE DRIVING ASSISTANCE METHOD AND SYSTEM FOR A VEHICLE TO AVOID HAZARDS

(71) Applicant: MACDONALD, DETTWILER AND ASSOCIATES INC., Brampton (CA)

(72) Inventors: Mingfeng Zhang, Mississauga (CA); Ho-Kong Ng, Thornhill (CA); Piotr Jasiobedzki, Mississauga (CA)

(73) Assignee: MacDonald, Dettwiler and Associates Inc., Brampton (CA)

( * ) Notice: Subject to any disclaimer, the term of this patent is extended or adjusted under 35 U.S.C. 154(b) by 0 days.

(21) Appl. No.: 18/439,421

(22) Filed: Feb. 12, 2024

(65) Prior Publication Data
US 2025/0013232 A1    Jan. 9, 2025

Related U.S. Application Data

(60) Continuation of application No. 17/513,237, filed on Oct. 28, 2021, now abandoned, which is a division of application No. 15/849,427, filed on Dec. 20, 2017, now Pat. No. 11,231,714.

(60) Provisional application No. 62/472,956, filed on Mar. 17, 2017, provisional application No. 62/437,965, filed on Dec. 22, 2016.

(51) Int. Cl.
*G05D 1/00*    (2024.01)
*G06V 20/58*   (2022.01)

(52) U.S. Cl.
CPC ......... *G05D 1/0214* (2013.01); *G05D 1/0217* (2013.01); *G05D 1/0248* (2013.01); *G06V 20/58* (2022.01)

(58) Field of Classification Search
CPC .. G05D 1/0214; G05D 1/0217; G05D 1/0248; G06V 20/58
See application file for complete search history.

(56) References Cited

U.S. PATENT DOCUMENTS

| | | | |
|---|---|---|---|
| 3,719,246 A | * | 3/1973 | Bott ........................ B60T 8/246 |
| | | | 188/112 A |
| 5,006,988 A | | 4/1991 | Borenstein et al. |
| 5,761,630 A | | 6/1998 | Sekine |

(Continued)

FOREIGN PATENT DOCUMENTS

WO    2009092374 A1    7/2009

OTHER PUBLICATIONS

Koren, Y. and J. Borenstein, "Potential field methods and their inherent limitations for mobile robot navigation," Proceedings of 1991 IEEE International Conference on Robotics and Automation, April 7-12, pp. 1398-1404 (DOI: 10.1109/ROBOT.1991.131810).

(Continued)

*Primary Examiner* — Harry Y Oh
(74) *Attorney, Agent, or Firm* — HILL & SCHUMACHER

(57) ABSTRACT

The present disclosure provides a driving assistance method and system for a mobile vehicle to avoid hazards in its environment. This system can detect hazards in a vehicle's surroundings and unobtrusively adjust its driving module's driving commands when necessary to avoid hazards. The system is configured to allow it to provide interference-free assistance to the operator of a human-operated vehicle or the motion controller of an autonomous vehicle to avoid hazards.

6 Claims, 6 Drawing Sheets

(56) References Cited

U.S. PATENT DOCUMENTS

| | | | |
|---|---|---|---|
| 6,157,892 | A | 12/2000 | Hada et al. |
| 7,647,178 | B2 | 1/2010 | Ekmark et al. |
| 8,060,306 | B2 | 11/2011 | Puhalla et al. |
| 8,392,104 | B2 | 3/2013 | Nishira et al. |
| 8,761,990 | B2 | 6/2014 | Chrysanthakopoulos et al. |
| 8,849,494 | B1 | 9/2014 | Herbach et al. |
| 2004/0090117 | A1 | 5/2004 | Dudeck |
| 2006/0058921 | A1* | 3/2006 | Okamoto ............ G05D 1/0272 701/25 |
| 2008/0015772 | A1 | 1/2008 | Sanma et al. |
| 2010/0023099 | A1 | 1/2010 | Hidaka et al. |
| 2010/0235099 | A1* | 9/2010 | Sakai ................. G08G 1/166 701/301 |
| 2012/0083947 | A1 | 4/2012 | Anderson et al. |
| 2012/0283912 | A1 | 11/2012 | Lee et al. |
| 2013/0325210 | A1 | 12/2013 | Palm |
| 2013/0338878 | A1 | 12/2013 | Fritz et al. |
| 2014/0207282 | A1 | 7/2014 | Angle |
| 2014/0316668 | A1* | 10/2014 | Akiyama ............ B60W 10/20 701/70 |
| 2015/0231784 | A1 | 8/2015 | Yamauchi |
| 2016/0009276 | A1 | 1/2016 | Moeller |
| 2016/0152236 | A1 | 6/2016 | Yi et al. |
| 2016/0207509 | A1 | 7/2016 | Kida |
| 2017/0106857 | A1 | 4/2017 | Nasser |
| 2017/0229029 | A1 | 8/2017 | Klinger |

OTHER PUBLICATIONS

Ulrich and J. Borenstein. "VFH*: local obstacle avoidance with look-ahead verification." Proceedings of 2000 IEEE International Conference on Robotics and Automation, San Francisco, CA, Apr. 24-28, 2000, pp. 2505-2511 (10.1109/ROBOT.2000.846405).

Felix von Hundelshausen, Michael Himmelsbach, Falk Hecker, Andre Mueller, and Hans-Joachim Wuensche, "Driving with Tentacles: Integral Structure for Sensing and Motion", Journal of Field Robotics, 25(9), 640-673, 2008 (DOI 10.1002/rob.20256).

International Search Report for PCT/CA2017/051563, dated Apr. 13, 2018.

* cited by examiner

UNOBTRUSIVE DRIVING ASSISTANCE METHOD AND SYSTEM FOR A VEHICLE TO AVOID HAZARDS

FIELD

The present disclosure relates to a driving assistance method and system for human-operated (either manually, through tele-operation, or by other means) or autonomous vehicles which provides unobtrusive assistance in avoiding hazards.

BACKGROUND

Despite the advancement in autonomous navigation in recent years, manual operation of robotic vehicles is still the preferred approach in many scenarios. For example, security robots are generally tele-operated. Manually operating a robot may be an extremely demanding and exhausting task to operators due to limited situation awareness, especially in an unknown remote environment. One major challenge is hazard avoidance; however, conventional hazard avoidance techniques are largely intended for mobile robots under autonomous navigation and do not consider the scenario with human operators in the loop.

Conventional hazard avoidance approaches for mobile robots can be roughly divided into two categories: global and local. If a hazard map of the operational space of a mobile robot and a goal position are given, hazard avoidance is essentially a path planning problem for mobile robots since a global hazard-free path can be planned in advance. This is generally referred to as the global approach for hazard avoidance. If a map is not given, or there are unknown and/or moving objects in the environment, hazards must be detected by onboard sensors and avoided while the robot is moving towards its destination.

Hazard avoidance solutions in this category are known as local or reactive approaches. They generally keep updating a local map of a robot's immediate environment and generate a short-term path within the map to avoid nearby hazards. This hazard-free path generated on the fly could be as simple as a heading direction or a single way-point that can safely lead the robot to a nearby location. For its short planning horizon, this hazard-avoiding path is considered as a local path, as opposed to a global path that leads a mobile robot to its final destination. A local path is executed immediately after being generated, and in the meantime, the robot deviates from its global path. Due to the path re-planning mechanism, this category of hazard avoidance approaches can be best described as "path-altering" methods.

Techniques for generating local hazard-free paths can be divided into heuristic, optimization-based, and sampling-based approaches. Early "path-altering" approaches such as the artificial potential filed method (PFM) and the virtual force field (VFF) method are heuristic in finding local hazard-free paths. These two methods and their variants represent hazards as repulsive forces and the destination of a mobile robot as an attractive force exerted on it. The resulting force is then accepted as a safe heading direction for the mobile robot. Although they are simple and efficient in producing a directional command for collision-free movement, these methods have been found limited in narrow environments with dense obstacles or uneven terrain. This drawback can be attributed to the fact that the information of hazard distribution is largely lost in the resultant repulsive force, which is reduced to a single vector.

A detailed description of the principles and limitations of these two methods is given by Johann Borenstein in Y. Koren and J. Borenstein, "Potential field methods and their inherent limitations for mobile robot navigation," Proceedings of 1991 IEEE International Conference on Robotics and Automation (DOI: 10.1109/ROBOT.1991.131810). Later Johann Borenstein et. al. proposed the famous vector field histogram (VFH) method, which is disclosed in U.S. Pat. No. 5,006,988A. This improved solution provides some remedies to the shortcoming of PFM and VFF by taking the distribution of hazards into consideration. It employs a one-dimensional polar histogram to hold the obstacle density in multiple angular sectors around a vehicle's location, and the angular sector holding the lowest score in the histogram thus indicates the safe heading direction for the vehicle.

Optimization-based approaches rely on an objective function to balance two often competing goals in a navigation task: reaching a global destination and avoiding local obstacles. Through optimization the deviation from a global path or a desired heading direction can be minimized during obstacle avoidance. An example of this technique can found in an extension of the VFH method, which was disclosed in I. Ulrich and J. Borenstein. "VFH*: local obstacle avoidance with look-ahead verification." Proceedings of 2000 IEEE International Conference on Robotics and Automation (10.1109/ROBOT.2000.846405). The cost function in the optimization approach contains a term that represents the deviation from the target direction; as a result, its solution provides a safe heading direction that minimizes such deviations.

Instead of calculating an alternative path through heuristic or optimizing means, sampling-based approaches draw a set of local paths and then select a hazard-free one from the set. A sampling-based navigation system for hazard avoidance is described by Felix von Hundelshausen et. al. in Felix von Hundelshausen, Michael Himmelsbach, Falk Hecker, Andre Mueller, and Hans-Joachim Wuensche, Driving with Tentacles: Integral Structure for Sensing and Motion, Journal of Field Robotics, 25(9), 640-673, 2008 (DOI 10.1002/rob.20256). This system first discretizes the basic driving options of a vehicle by a set of pre-calculated trajectories, which are called tentacles for their similarity to an insect's antennae or feelers, and then selects a safe and feasible trajectory to avoid nearby obstacles. With sufficient samples, the sampling-based approaches are more likely to find better local paths than heuristic approaches, and they are more likely to avoid local minima compared with optimization-based approaches. In addition, the sampling-based approaches can systematically handle a mobile robot's motion constraints such as limits on its speed and trajectory curvature. Either by only generating feasible path candidates in the sampling step or by only choosing a feasible one in the vetting step, this method guarantees that the selected obstacle-avoiding path does not violate the robot's motion constraints. For example, a sampling-based obstacle avoidance system disclosed in U.S. Pat. No. 7,647,178 only considers feasible "obstacle-avoiding maneuvers" in its sampling pool. This would exclude any maneuvers that may violate the robot's motion constraints from the candidate set.

The "path-altering" approaches have been applied to many mobile robots, and some have achieved great success. For example, the sampling-based approach developed by Hundelshausen et. al. was successfully demonstrated in the Civilian European Land Robot Trial 2007 and the 2007 DARPA Urban Challenge. Despite the successful applications of some obstacle avoidance systems based on the "path-altering" principle, this category of solutions is largely restricted to autonomous navigation of mobile robots and cannot be directly applied to mobile vehicles that are primarily controlled by human operators. When a "path-altering" approach is applied to a human-operated vehicle, it needs take complete control of the vehicle whenever it executes a local obstacle-free path. This new path may be quite different from the heading (steering angle) specified by the driver. In the meantime, the operator's driving commands are completely rejected; consequently, the operator will momentarily feel a loss of control of the vehicle. This may cause significant interferences to the human operator, thus making "path-altering" approaches a less desirable option for collision avoidance functions when applied to human-operated vehicles.

There is another class of optimization-based obstacle avoidance approaches which solve their objective functions in the velocity space instead of the position space. By directly solving an optimization problem in the velocity space, these methods can take a robot's dynamics and velocity constraints into consideration, which is an improvement over optimization-based methods that are formulated in the position space. An optimization-based obstacle avoidance system disclosed in U.S. Pat. No. 8,060,306 B2 defines its objective function as a function of a robot's translational and rotational speeds. This object function includes a measure of alignment with the robot's target heading, the clearance to obstacles, the forward velocity of the robot, and the change of the robot's velocity. It directly provides obstacle-avoiding velocity commands while it seeks to balance the goal of reaching the target location, avoiding nearby obstacles, and ensuring smooth motion of the robot. Like "path-altering" approaches, these methods will exhibit similar interference issues when applied to human-operated vehicles because they lack the capability of considering an operator's instantaneous driving commands.

While without formally recognizing this interference issue, some obstacle avoidance techniques proposed specifically for human-operated robots directly augment an operator's driving commands to avoid obstacles, as opposed to providing an alternative path. For example, U.S. Pat. No. 8,761,990 B2 discloses a navigation system that can overwrite a user's "driving suggestions" to avoid obstacles. It allows user-suggested driving commands to drive a mobile vehicle until obstacle detection indicates an anticipated collision with an obstacle. Afterwards, it applies one of a few predefined "primitive" collision-avoiding actions, such as reducing the vehicle's linear speed and/or angular speed, driving the vehicle towards an open space, and stopping the vehicle. By directly augmenting an operator's driving commands, this type of techniques does not have to take control of a vehicle for extended periods, so they are less likely to cause severe interference compared with "path-altering" approaches.

The interference issue of this type of techniques is formally mentioned in U.S. patent application No. 201602075039A1. The driving assistance apparatus disclosed therein contains a procedure to identify unnecessary interventions for obstacle avoidance; therefore, it is claimed that this apparatus can reduce interference to a vehicle's driver by only applying necessary interventions. The capability of obstacle avoidance has also been integrated into driving assisting systems for automobiles. Popular obstacle avoidance strategies adopted by driving assisting systems for automobiles include auto-braking and turning augmentation. For example, U.S. Pat. No. 6,157,892 A discloses a driving assisting system that relies on two assisting operations to assist obstacle avoidance, namely an automatic braking operation and a so-called "turnability" increasing control operation. If this system determines that a safe direction exists, it applies the "turnability" increasing control operation to assist the driver's steering control; otherwise, it applies the auto-braking to stop the automobile before any collisions. Since these methods directly interact with drivers' commands, they fall into the same category of the preceding obstacle avoidance approaches for human-operated robots.

Despite their improvements over "path-altering" approaches, interference is inevitable in these techniques for two reasons. First, these solutions do not have an effective way to determine when an intervention to a driver's commands is absolutely necessary to avoid an obstacle. This may cause interference when unnecessary interventions are applied. Second, the schemes for choosing obstacle-avoiding actions are primitive. They generally does not consider a vehicle's current motion and tend to ignore an operator's driving intention. This may cause unsmooth or jittering feelings to the operator.

SUMMARY

In light of the "interference-prone" nature of existing obstacle avoidance solutions, this disclosure presents a new obstacle avoidance system that provides unobtrusive obstacle avoidance assistance to human-operated vehicles. The system disclosed herein can determine whether an operator's driving commands are safe in the presence of navigational hazards (obstacles) and directly adjust unsafe driving commands in the least intrusive way to assist the operator to avoid such hazards. Hazards include obstacles above ground that the vehicle can collide with, "negative" obstacles such as cliffs or holes in the ground that the vehicle can drive into, and hazardous terrain such as steep slopes or stairs, which the vehicle can only traverse along certain direction and/or at reduced speed or should not enter. The novelty of this hazard avoidance system is its unobtrusive and assistive nature, which allows it to seamlessly assist a human operator of a mobile vehicle without causing interference whether driving directly or remotely from the vehicle. The "command-altering" mechanism of this system implies that it can interact with similar driving commands issued by autonomous navigation systems; therefore, this system can be applied to autonomous vehicles as well.

The present invention is directed to a driving assistance system for a vehicle. This system uses on-board perception to detect nearby hazards and provides unobtrusive hazard avoidance assistance for both human-operated and autonomous vehicles, said vehicles having one or more positioning sensors, one or more rangefinders, a computer, and a driving module.

One aspect of this invention provides a method of providing unobtrusive driving assistance to a vehicle to avoid hazards, the vehicle having a computer, one or more positioning sensors connected to said computer, one or more rangefinder sensors connected to said computer, a driving module interfaced with said computer, said method comprising:
  a) acquiring raw sensor data from said one or more positioning sensors and said one or more rangefinder sensors;
  b) estimating a state of said vehicle from said raw data from said one or more positioning sensors;
  c) identifying hazards to said vehicle from said raw data from said one or more rangefinder sensors;

d) computing a range of safe driving commands for all said hazards;
e) receiving driving commands from said driving module and comparing them with said range of safe driving commands; and
f) if said driving commands fall outside of said range of safe driving commands, adjusting said driving commands from said driving module and passing the adjusted driving commands to said vehicle, otherwise if said driving commands fall within said range of driving commands, passing said driving commands to said vehicle without modification.

The step of computing the range of safe driving commands may be done by using the locations of said hazards, the characteristics of said hazards (e.g., obstacle's size and height or depth, slope, roughness, soil type), a kinematic model of the vehicle, the vehicle's geometric shape, attitude and velocity, and a safety clearance between hazards and the vehicle. The safety clearance can be adjusted during runtime according to said vehicle's velocity and said hazards' distribution. The step of adjusting said driving commands from the driving module produces driving commands that are within said range of safe driving commands and within the velocity and the attitude limit of said vehicle. The obstacles height, depth, slope roughness, can be calculated from rangefinder or 3D camera data. Soil type can be estimated from the traction system of the vehicle.

The state of the said vehicle may include velocity, turning radius and an attitude (orientation of the vehicle with respect to the gravity vector both in the longitudinal and lateral directions).

Different from "path-altering" hazard avoidance approaches, the proposed method does not generate an alternative path and force a vehicle to follow it to avoid hazards. Instead, it directly adjusts driving commands of a vehicle to change its motion to avoid or handle hazards. Built upon this novel "command-altering" mechanism, the proposed method has two advantages over "path-altering" approaches in reducing interference to a driving module. First, this method does not intervene in the vehicle's normal motion unless its driving module's commands are deemed unsafe. This method provides a systematic way to determine whether the driving module's commands are safe in the presence of hazards, so it avoids imposing unnecessary interventions to the driving module by only adjusting unsafe comments. In other words, the effective horizon of such adjustments lasts only as long as the commands are determined unsafe, so this method does not need to take control a vehicle for extended periods. Second, it is able to capture the driving intention of a driving module while adjusting its unsafe commands.

This method assumes that a driving module's instantaneous commands represent its driving intention, so it does not reject them without consideration even if they were deemed unsafe. It seeks to replace unsafe commands by the closest safe and feasible commands so that the driving intention embedded in them is retained. Because this method can accurately distinguish between safe and unsafe commands, and adjust unsafe commands with minimal correction, the driving module's driving intention is respected to the maximum extent possible. By contrast, conventional approaches, particularly the ones involving optimization, tend to find an alternative hazard-free path that is optimal in a certain sense but may significantly deviate from the intention of the driving module.

For example, they may repeatedly find an alternative path pointing to the widest gap between nearby hazards regardless of the driving module's commands, while the proposed method will strive to follow the driving module's commands as closely as possible even if it chooses to drive through a narrower gap. In a preferred embodiment of this invention, in the presence of hazards, the driving modules corrective commands are the minimal change in driving command (e.g. velocity) from that originally specified by the operator. The subtle difference between the operator's specified commanded velocity and the driving module corrective driving commands contribute to this seamless, and unobtrusive safety correction. In a path altering approach, the instantaneous command of a new path (a position trajectory) is more likely to produce more abrupt changes in the instantaneous velocity of the vehicle, leading to this perception of interference on the part of the operator.

The present invention also provides a driving assistance system mounted on a vehicle for detecting and avoiding hazards, said system comprising:
a) one or more positioning sensors mounted on the vehicle, one or more rangefinders mounted on the vehicle, and a computer on board the vehicle, said one or more positioning sensors and one or more rangefinders being interfaced with said computer, said computer being interfaced with the vehicle's actuation system;
b) said computer being programmed with instructions for computing a range of safe driving commands including
   i) computing a range of all safe trajectories for said vehicle to avoid or handle any hazards in the environment of said vehicle detected by said one or more rangefinders, and
   ii) converting said range of safe trajectories into a range of safe driving commands by using an inverse kinematic model of said vehicle;
c) said computer being programmed with instructions for adjusting said driving module's driving commands including:
   i) comparing the driving commands from said driving module with said range of safe driving commands,
   ii) adjusting the driving commands from said driving module if they are outside the range of safe driving commands; and
   iii) adjusting said adjusted driving commands so that they conform to the dynamic constraints and velocity limits of said vehicle
d) said computer being programmed with instructions for notifying said driving module of said command adjustment and hazard information.

The present disclosure provides a non-transitory computer-readable media containing instructions, which when read and executed by a computer, causes the computer to execute a method for providing unobtrusive driving assistance to a vehicle to avoid and handle hazards, the vehicle having a computer, one or more positioning sensors connected to said computer, one or more rangefinder sensors connected to said computer, a driving module interfaced with said computer, said method comprising:
a) acquiring raw sensor data from said one or more positioning sensors and said one or more rangefinder sensors;
b) estimating a state of said vehicle from said raw data from said one or more positioning sensors;
c) identifying hazards to said vehicle from said raw data from said one or more rangefinder sensors;
d) computing a range of safe driving commands for all said hazards;

e) receiving driving commands from said driving module and comparing them with said range of safe driving commands; and f) if said driving commands fall outside of said range of safe driving commands, adjusting said driving commands from said driving module and passing the adjusted driving commands to said vehicle, otherwise if said driving commands fall within said range of driving commands, passing said driving commands to said vehicle without modification.

A further understanding of the functional and advantageous aspects of the disclosure can be realized by reference to the following detailed description and drawings.

BRIEF DESCRIPTION OF THE DRAWINGS

Embodiments of the driving assistance method and system will now be described, by way of example only, with reference to the drawings. The drawings are not necessarily to scale. For clarity and conciseness, certain features of the invention may be exaggerated and shown in schematic form.

DETAILED DESCRIPTION OF THE INVENTION

Figure 1:
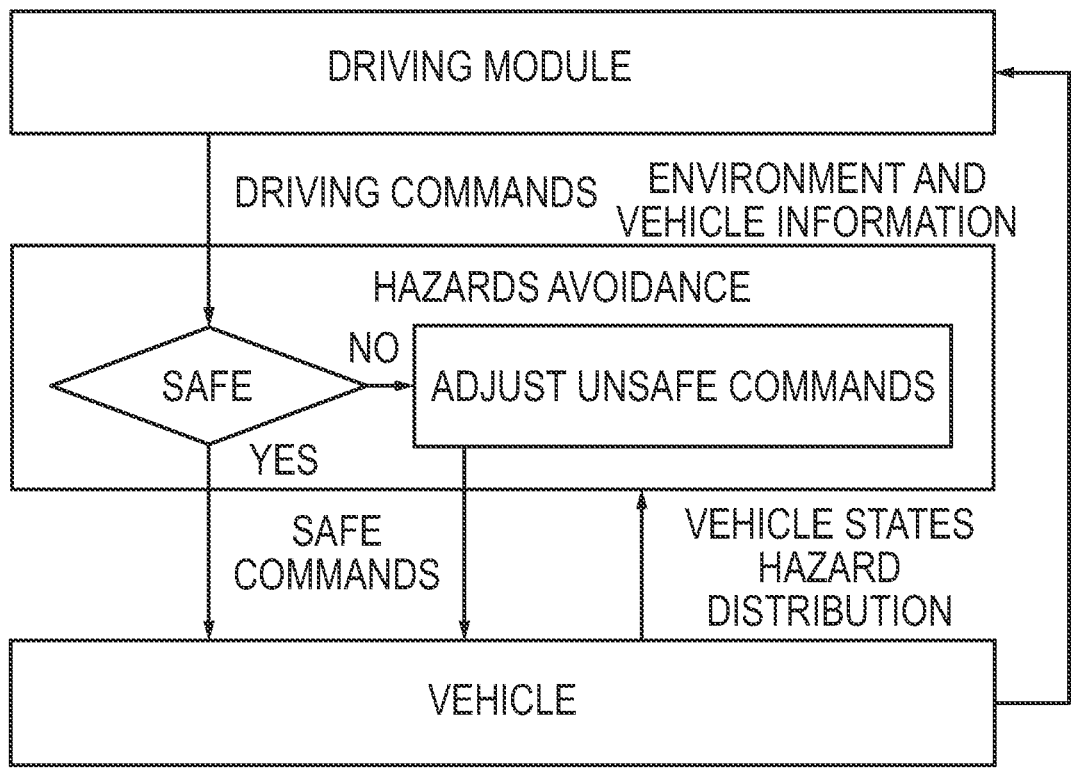
FIG. 1 shows the concept of the present hazard avoidance method in which the hazard avoidance works as an unobtrusive driving assistance system for a vehicle and its driving module.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps, or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the phrase "range sensor" refers to a device for accurately measuring the distance to objects within a certain viewing scope of the device. The distance measurements can be based on any of a number of principles, including time-of-flight, triangulation, phase difference, etc. A "scan" means a set of distance data collected from the range sensor at a particular instance. The term "rangefinder" or "3D camera" is sometimes used as a synonym to "range sensor".

As used herein, the phrase "positioning sensor(s)" refers to a device used to estimate the position and orientation of a vehicle. Examples of positioning sensors include odometric sensors, inertial measurement units, GPS receivers, etc.

As used herein, the phrases "kinematic model" and "vehicle kinematics" typically refer to a model for a vehicle that considers only the rate of change of the vehicle's configuration.

As used herein, the phrase "vehicle state" refers to, but is not limited to, any or combination of vehicle velocity, turning radius, attitude (orientation of the vehicle with respect to the gravity vector). Any parameter that may be used to characterize the vehicle operation and condition may be considered an element of the "state" of the vehicle.

As used herein, the term "hazard" refers to a feature or an object in the environment or the geometry of the ground that may block or be hazardous for the vehicle to traverse along its commanded path or direction. It can be an object above ground that the vehicle can collide with, a "negative obstacle" such as cliff or hole in the ground that the vehicle can fall into, or hazardous terrain such as steep slope or stairs, that the vehicle can only traverse only along a certain direction and/or at a reduced speed or cannot traverse at all.

As used herein, the phrase "avoiding hazard" means changing the path and velocity of the vehicle (e.g., adjusting trajectory, velocity profile).

As used herein, the term "driving module" refers to one or more persons or a computer system that issue driving commands to the vehicle. It can be one or more persons when the vehicle is operated manually. It can be a computer system for controlling the vehicle's motion automatically. In one embodiment a computer system running a way-point following method is used to control the vehicle's motion. In another embodiment, a security robot is remotely controlled by an operator via tele-operation. In a third embodiment, a vehicle is directly controlled with a human operator in the vehicle.

As used herein, the term "driving commands" means the commands issued by the driving module to control the motion of the vehicle. In a preferred embodiment the driving commands include a speed command for controlling the speed of travel of said vehicle and a steering command for controlling the direction of travel of the vehicle. Driving commands can be issued in other formats as well. For example, in a master-slave driving system for remote operation of robotic arms, the driving commands could be pose (position and orientation) information updated at a high rate.

As used herein, the term "unobtrusive", alone or in combination, indicates that the driving assistance provided by the present driving assistance system does not cause interference to said driving module.

As used herein, the term "actuation system" means a computer controlled system in a vehicle that may accept different types of driving commands (speed and heading/steering angle or incremental position change or a position coordinate in a global map) and servo control the vehicle to achieve these driving commands.

As required, preferred embodiments of the invention will be disclosed, by way of example only, with reference to drawings. It should be understood that the invention can be embodied in many various and alternative forms.

In an embodiment there is provided a computer implemented method of providing unobtrusive driving assistance to a vehicle to avoid and handle hazards, the vehicle having a computer, one or more positioning sensors connected to the computer, one or more rangefinder sensors connected to the computer, a driving module interfaced with the computer, the method comprising:
 a) acquiring raw sensor data from the one or more positioning sensors and the one or more rangefinder sensors;
 b) estimating a state of the vehicle from the raw data from the one or more positioning sensors;
 c) identifying hazards to the vehicle from the raw data from the one or more rangefinder sensors;
 d) computing a range of safe driving commands for all the hazards;
 e) receiving driving commands from the driving module and comparing them with the range of safe driving commands; and
 f) if the driving commands fall outside of the range of safe driving commands, adjusting the driving commands from the driving module and passing the adjusted driving commands to the vehicle, otherwise if the driving commands fall within the range of driving commands, passing the driving commands to the vehicle without modification.

In an embodiment the one or more positioning sensors and the one or more rangefinder sensors are interfaced with the computer and the computer is interfaced with the vehicle's actuation system and driving module.

In an embodiment the state of the vehicle includes velocity of the vehicle, which is generated by using the raw sensor data from the one or more positioning sensors and a kinematics model of the vehicle.

In an embodiment the state of the vehicles includes velocity and attitude of the vehicle, which are generated by using, the raw sensor data from the one or more positioning sensors and a kinematics model of the vehicle.

In an embodiment the hazards are characterized for their traversability by the vehicle using the raw data from the rangefinder sensors.

In an embodiment the step of computing the range of safe driving commands is done by using the locations of the hazards, characteristics of the hazards, a kinematic model of the vehicle, the vehicle's geometric shape, state, and a safety clearance between hazards and the vehicle.

In an embodiment the step of adjusting the driving commands from the driving module produces driving commands that are within the range of safe driving commands and within the velocity and inclination limits of the vehicle.

In an embodiment the safety clearance can be specified by a user.

In an embodiment the safety clearance can be adjusted during runtime according to the vehicle's state and the hazards' distribution.

In an embodiment the range of safe driving commands for a vehicle to avoid detected hazards, comprising the steps of:
 a) partitioning all detected hazards into multiple zones around the vehicle;
 b) Identifying one or more critical points on the vehicle for each of the zones;
 c) computing one critical trajectory for each of the critical points to avoid each hazard in the zone that is corresponding to the critical point;
 d) calculating the curvature of each critical trajectory;
 e) measuring the vehicle attitude and estimating its stability;
 f) calculating the range of safe curvatures for each of the hazards with the range's boundaries defined by the critical trajectories; and
 g) calculating the intersection all ranges of safe curvatures.

In an embodiment the size of the partitioned zones are sized according to the vehicle's state and the hazards' distribution.

In an embodiment the step of measuring the vehicle attitude and estimating its stability is performed by calculating the position of the center of mass of the vehicle with respect to the contacting point between the vehicle and the ground along the critical trajectories.

In an embodiment there is provided a method for adjusting the driving module's unsafe driving command, comprising the steps of:
 a) changing the turning rate of the unsafe command within the vehicle's turning rate limits until the resulting curvature of the changed command is within the range of safe curvature; otherwise
 b) changing the speed of the unsafe commands within the vehicle's speed limits until the resulting curvature of the changed command is within the range of safe curvature; otherwise,
 c) setting both the speed and turning rate of the unsafe command to zero.

In an embodiment there is provided a driving assistance system mounted on a vehicle for detecting and avoiding hazards, the system comprising:
 a) one or more positioning sensors mounted on the vehicle, one or more rangefinders mounted on the vehicle, and a computer on board the vehicle, the one or more positioning and vehicle state sensors and one or more rangefinders being interfaced with the computer, the computer being interfaced with the vehicle's actuation system;
 b) the computer being programmed with instructions for computing a range of safe driving commands including i) computing a range of all safe trajectories for the vehicle to avoid any hazards in the environment of the vehicle detected by the one or more rangefinders, and ii) converting the range of safe trajectories into a range of safe driving commands by using an inverse kinematic model of the vehicle;

c) the computer being programmed with instructions for adjusting the driving module's driving commands including:

i) comparing the driving commands from the driving module with the range of safe driving commands, ii) adjusting the driving commands from the driving module if they are outside the range of safe driving commands; and iii) adjusting the adjusted driving commands so that they conform with the dynamic constraints and velocity limits of the vehicle;

d) the computer being programmed with instructions for notifying the driving module of the command adjustment and hazard information.

In an embodiment the computer is interfaced with the vehicle's throttle and engine system through a drive control means to adjust a speed of travel of the vehicle and the vehicle's steering system through a steering control means to adjust a direction of travel of the vehicle.

In an embodiment there is provided a method for computing critical trajectories to avoid hazards in the vicinity of a vehicle, comprising the steps of:

a) partitioning all detected hazards into one or more zones around the vehicle;

b) identifying one or more critical points on the vehicle for each of the one or more zones; and c) computing one critical trajectory for each of the critical points to avoid or handle each hazard in the zone that is corresponding to the critical point.

In an embodiment there is provided a non-transitory computer-readable media containing instructions, which when read and executed by a computer, causes the computer to execute a method for providing unobtrusive driving assistance to a vehicle to avoid and handle hazards, the vehicle having a computer, one or more positioning sensors connected to the computer, one or more rangefinder sensors connected to the computer, a driving module interfaced with the computer, the method comprising:

a) acquiring raw sensor data from the one or more positioning sensors and the one or more rangefinder sensors;

b) estimating a state of the vehicle from the raw data from the one or more positioning sensors;

c) identifying hazards to the vehicle from the raw data from the one or more rangefinder sensors;

d) computing a range of safe driving commands for all the hazards;

e) receiving driving commands from the driving module and comparing them with the range of safe driving commands; and f) if the driving commands fall outside of the range of safe driving commands, adjusting the driving commands from the driving module and passing the adjusted driving commands to the vehicle, otherwise if the driving commands fall within the range of driving commands, passing the driving commands to the vehicle without modification.

The one or more positioning sensors and the one or more rangefinder sensors are interfaced with the computer and the computer is interfaced with the vehicle's actuation system and driving module.

In an embodiment the state of the vehicle includes velocity of the vehicle, which is generated by using the raw sensor data from the one or more positioning sensors and a kinematics model of the vehicle.

In an embodiment the state of the vehicles includes velocity and attitude of the vehicle, which are generated by using, the raw sensor data from the one or more positioning sensors and a kinematics model of the vehicle.

In an embodiment the hazards are characterized for their traversability by the vehicle using the raw data from the rangefinder sensors.

In an embodiment the step of computing the range of safe driving commands is done by using the locations of the hazards, characteristics of the hazards, a kinematic model of the vehicle, the vehicle's geometric shape, state, and a safety clearance between hazards and the vehicle.

In an embodiment the step of adjusting the driving commands from the driving module produces driving commands that are within the range of safe driving commands and within the velocity and inclination limits of the vehicle.

In an embodiment the safety clearance can be specified by a user.

In an embodiment the safety clearance can be adjusted during runtime according to the vehicle's state and the hazards' distribution.

Figure 2:
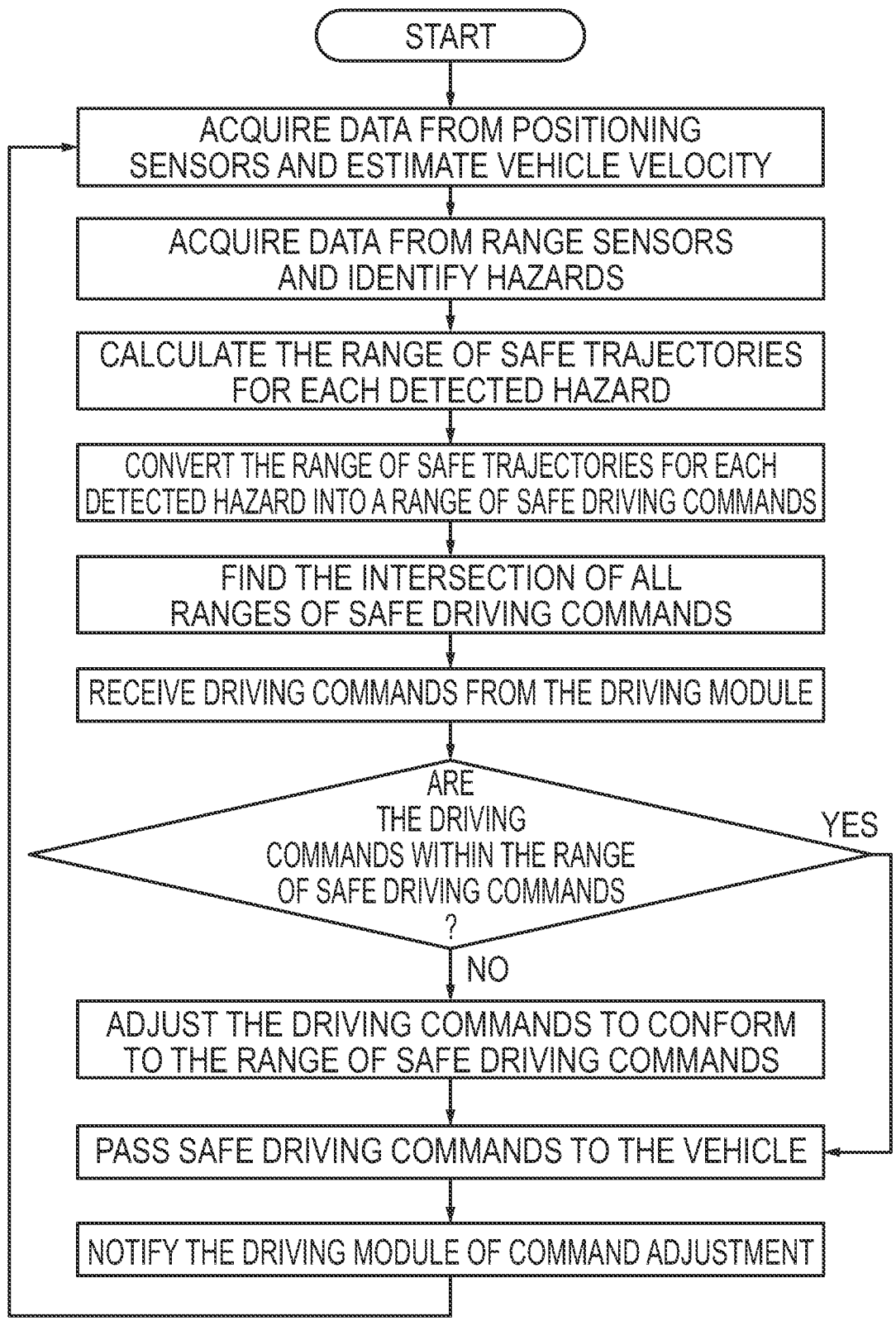
FIG. 2 shows the workflow of the present hazard avoidance system.
Figure 3A:
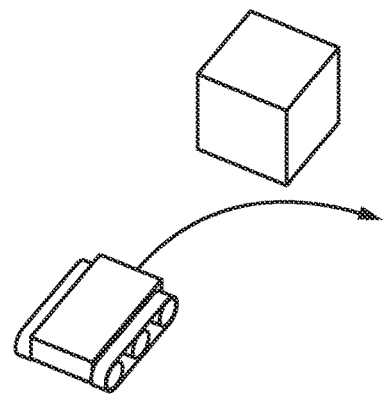
FIGS. 3(a), (b) and (c) show the critical trajectories for a vehicle to avoid or handle different types of hazard.
Figure 3B:
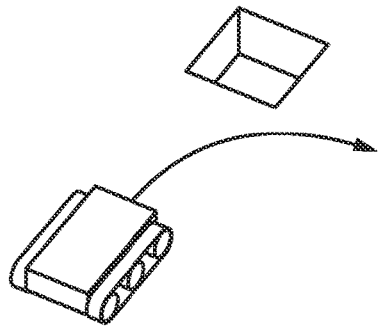
Figure 3C:
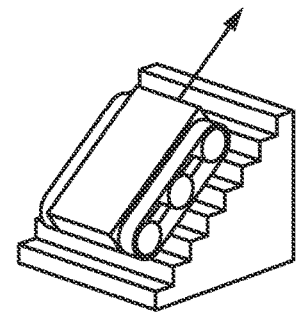

The present invention provides a driving assistance system for a vehicle to detect and avoid hazards. FIG. 1 shows a block diagram of said driving assistance system for providing hazard avoidance assistance. This system makes uses of one or more rangefinders mounted on a vehicle for detecting hazards in its environment. FIG. 2 shows the workflow of the present hazard avoidance system. For each detected hazard, the method calculates a range of safe trajectories and velocity profiles for the vehicle to traverse. FIGS. 3(a), (b) and (c) show three hazard examples and preferred behavior of the vehicle. FIG. 3(a) shows the vehicle approaching a hazard—an object located in its path—the avoidance maneuver changes the path and velocity profile to avoid impending collision. FIG. 3(b) shows a negative obstacle (a recession in the ground) in the path and a similar maneuver redirecting the vehicle to avoid falling into the opening in the ground. FIG. 3(c) shows the vehicle climbing stairs. The safest trajectory is to steer in the direction perpendicular to the incline to avoid tipping or sliding sideways, falling off the side or colliding with barriers/walls if they are present. Inclination of terrain (stairs) ahead of the vehicle can be sensed with range sensors; the instantaneous inclination (longitudinal and lateral) of the vehicle can be sensed with on-board inertial sensors such as inclinometers and gyros. Velocity must be adjusted to avoid slipping.

Figure 4:
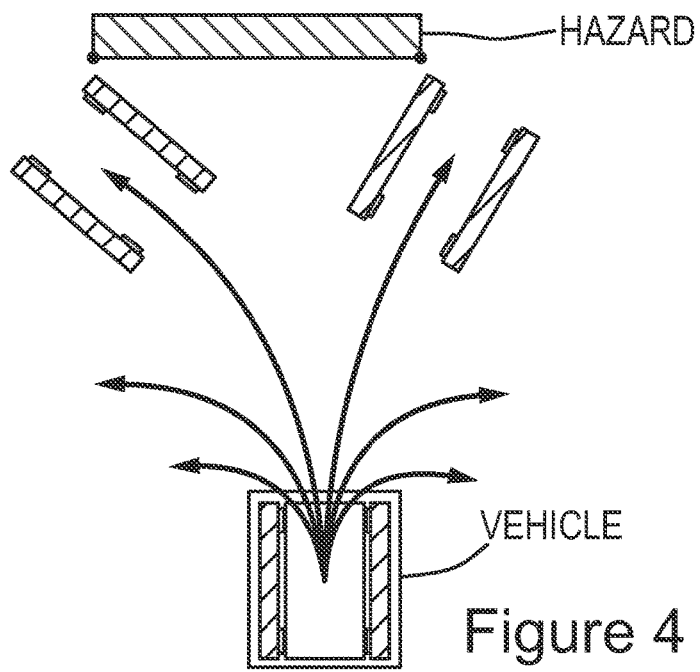
FIG. 4 shows a few examples of safe trajectories for a vehicle to avoid a hazard in its front.

FIG. 4 shows a few examples of safe trajectories for a vehicle to avoid a hazard located in its front. Afterwards, the range of safe trajectories for each hazard is converted into a range of safe driving commands by using an inverse kinematic model of the vehicle, and the intersection of all ranges is the final range of safe commands for the vehicle to avoid all detected hazards. Driving commands issued by a driving module are then compared with said range of safe driving commands. If they are within said range, then they are passed to the vehicle directly. Otherwise, the system adjusts them to fit said range before passing them to the vehicle. This method minimizes its interference to the vehicle's motion and to the driving module by limiting its effective horizon within the vehicle's immediate vicinity, defining a unique partition of proximate hazards, and adopting a realistic representation of the geometrical shape of the vehicle.

Conventional hazard avoidance methods determine collisions based on the distance from a hazard to the center of a vehicle by modeling the vehicle as a round disk. This approximation contains a lot of unnecessary safety margins in some areas around the vehicle, and it does not distinguish hazards in difference directions. As a result, these conventional hazard avoidance methods tend to be very conservative in determining collision, often identifying "false positives". In one embodiment of the present method, the vehicle is preferably modeled as a rectangle, which is a more realistic representation of the footprint of most ground vehicles, and hazards around the vehicle are divided into multiple zones. Each zone is associated with one or more critical points on the vehicle's edge, and the potential collision with a hazard is determined by its distance to the critical points associated with the zone to which this hazard belongs. This eliminates almost all approximation in the process of determining collisions, and hence collision determination in the present method is much more reliable and accurate. This results in accurate determination of the safety of a driving motion's driving commands, which is critical to the unobtrusiveness of the present method.

Hazard Detection

The vehicle employs one or more said rangefinders (e.g., laser rangefinder) or 3D cameras to detect and characterize obstacles in its proximate environment.

Computing the Range of Safe Driving Commands

One embodiment adopts the Dubin's car model to represent the vehicle's kinematics. Under this model, the vehicle's trajectory over a short period can be approximated by an arc of curvature $\tau$. In other words, the vehicle's immediate trajectory can be parameterized by one single parameter: its curvature $\tau$ or its radius R where $\tau=1/R$. Furthermore, in this embodiment the vehicle's driving command includes linear speed and turning rate, denoted by $v_c$ and $w_c$ respectively. The curvature of the vehicle's projected trajectory under commands $v_c$ and $w_c$ is $\tau_c=w_c/v_c$. The mapping between the driving commands and the trajectory curvature allows for direct comparison between driving commands and vehicle trajectories.

Figure 5:
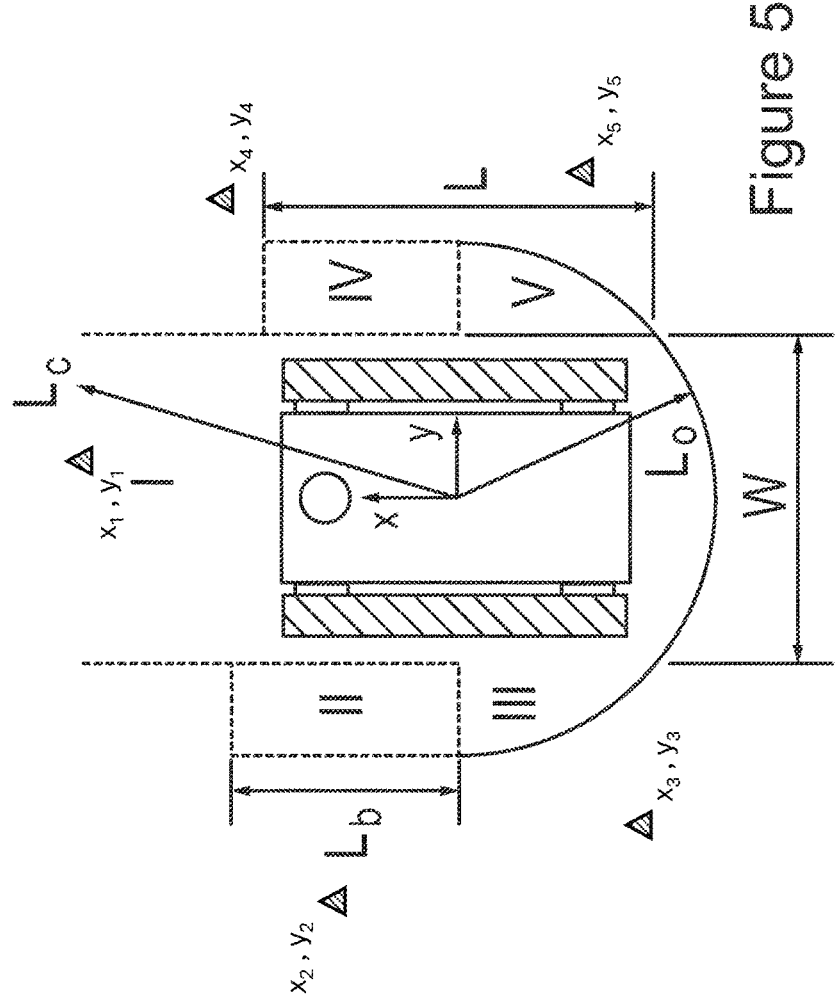
FIG. 5 shows the partition of five (5) detected exemplary hazards $(x_1, y_1)$, $(x_2, y_2)$, $(x_3, y_3)$, $(x_4, y_4)$ to $(x_5, y_5)$ represented by shaded triangles into five (5) Zones I, II, III, IV and V around a vehicle.

As illustrated in FIG. 5, this embodiment divides all detected hazards into five zones around the vehicle, and it models the vehicle's footprint with safety margins as a rectangle L×W. Zone I covers the area in front of the vehicle and includes hazards that are most critical to the vehicle's safety. The effective range of this zone, denoted by $L_c$, is the summation of half of the diagonal of the vehicle's footprint and the minimum brake-to-stop distance. It is the shortest distance for the vehicle to come to a complete stop at its maximum deceleration. The configurable factor $\gamma$ and constant $\gamma_0$ can be tuned to allow for some uncertainties in the brake-to-stop distance. Zones II and IV cover the left and right sides of the front portion of the vehicle. The width of these two zones is $L_a-W/2$, and their length, denoted by $L_b$, also depends on the speed of the vehicle. The configurable factor $\beta$ and constant $\beta_0$ can be tuned as well. Zone III and V, formed by the vehicle's bounding circle and its footprint, covers the two sides of the vehicle's rear portion. These dimensional parameters are given in the following equations.

$$L_a = \sqrt{L^2 + W^2}/2$$

$$L_b = L_a + \beta v + \beta_0$$

$$L_c = L_a + 2\gamma v^2/a_{max} + \gamma_0$$

Figure 6:
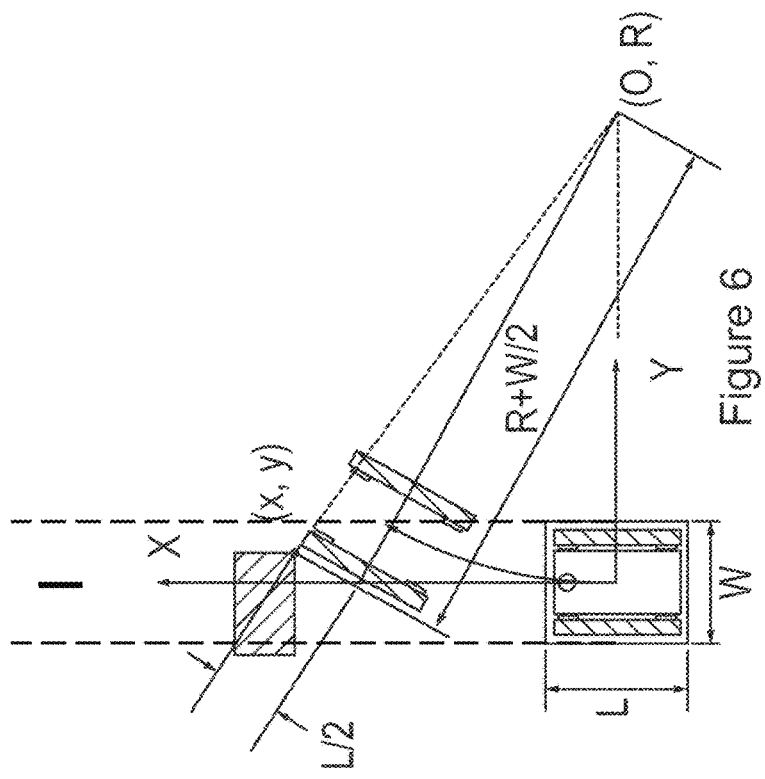
FIG. 6 shows the critical trajectory for a vehicle to avoid the hazard $(x_1, y_1)$ in Zone I, represented by $(x, y)$ for simplicity, in its front in which the vehicle turns right by following an arc of constant curvature $1/R$ in order to avoid the hazard $(x, y)$ in front.

For a hazard point (x, y) located in Zone I, the vehicle can turn left or right to avoid it. For each decision, a range of tuning curvature of the vehicle's motion that ensures hazard-free trajectories can be found. The curvature of a critical trajectory leads the vehicle to a position where its left or right front corner meets the hazard. For example, the center of the critical right-turning trajectory is denoted by (0, R) with $\tau=1/R$ as shown in FIG. 6. The radius of the arc must satisfy the following equation for the vehicle's left corner to meet the hazard (x, y) by turning right:

$$\left(R + \frac{W}{2}\right)^2 + \left(\frac{L}{2}\right)^2 = x^2 + (R-y)^2$$

The solution of this equation is:

$$R_1 = \frac{d^2 - L_a^2}{W + 2y}$$

where $d=\sqrt{x^2+y^2}$ is the distance between the hazard and the vehicle. This implies that the vehicle can pass this hazard point without hitting it by following any right-turning trajectory with a turning radius smaller than $R_1$.

Similarly, if the vehicle decides to avoid the hazard by turning left, the center of the critical left-turning arc, denoted by (0, −R), must satisfy:

$$\left(R + \frac{W}{2}\right)^2 + \left(\frac{L}{2}\right)^2 = x^2 + (-R-y)^2$$

The solution is:

$$R_2 = \frac{d^2 - L_a^2}{W - 2y}$$

which implies that the vehicle can also pass this hazard point without hitting it by following any left-turning trajectory with a turning radius smaller than $R_2$. Hence the center of any hazard-free trajectory in this case must satisfy $-R_2 \leq R \leq R_1$; equivalently, the curvature $\tau$ of hazard-free trajectories must satisfy:

$$\tau \geq \frac{W + 2y}{d^2 - L_a^2}$$

or $$\tau \leq \frac{-W + 2y}{d^2 - L_a^2}$$

Figure 7:
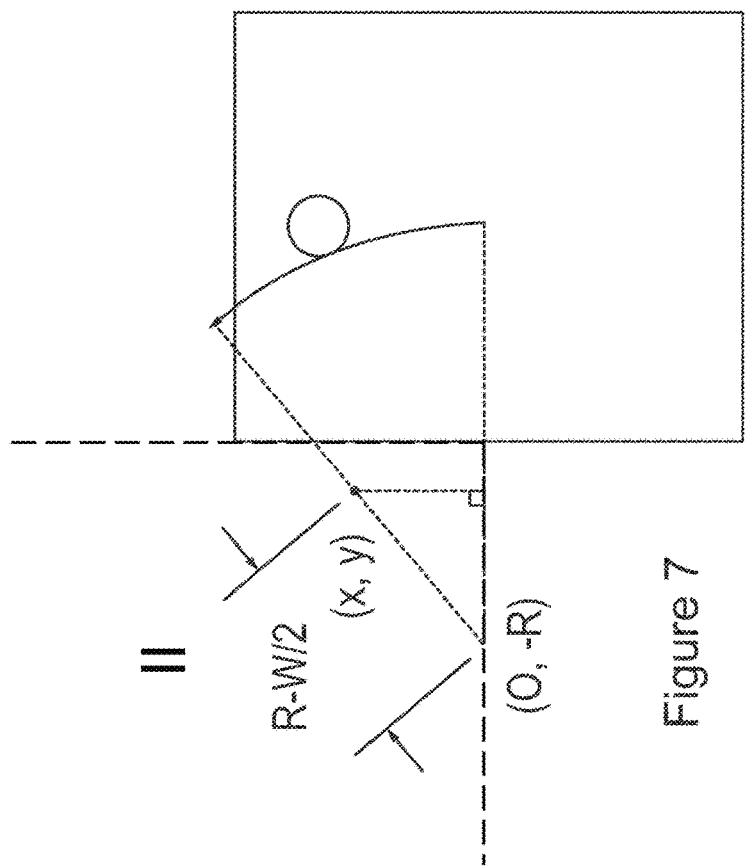
FIG. 7 shows the critical trajectory for a vehicle to avoid the hazard $(x_2, y_2)$ in Zone II, represented by $(x, y)$ for simplicity, on its side before its middle line such that the vehicle should avoid turning too much to the left to avoid the hazard $(x, y)$.

The range of safe curvatures to avoid hazards in other zones can be calculated in a similar way. For hazards Zones II or IV, the vehicle's choice is to minimize turning to the same side to avoid a collision. For example, when a hazard is located at (x, y) in Zone II, the vehicle can still turn left slightly without hitting it. The turning curvature of a critical trajectory leads the vehicle to a position where its left mid-point touches the hazard. As illustrated in FIG. 7, the radius of this trajectory must satisfy the following equation:

$$\left(R - \frac{W}{2}\right)^2 = x^2 + (-R - y)^2$$

The solution is $$R_1 = \frac{d^2 - W^2/4}{-W - 2y}$$

The corresponding curvature is $\tau_1 = -1/R_1$. For the vehicle to avoid this hazard, the curvature range must satisfy $$\tau \geq \frac{W + 2y}{d^2 - W^2/4}$$

which includes both left-turning and right-turning trajectories. Similarly, for a hazard located at (x, y) in Zone IV, the admissible curvature range is $$\tau \leq \frac{-W + 2y}{d^2 - W^2/4}$$

Figure 8:
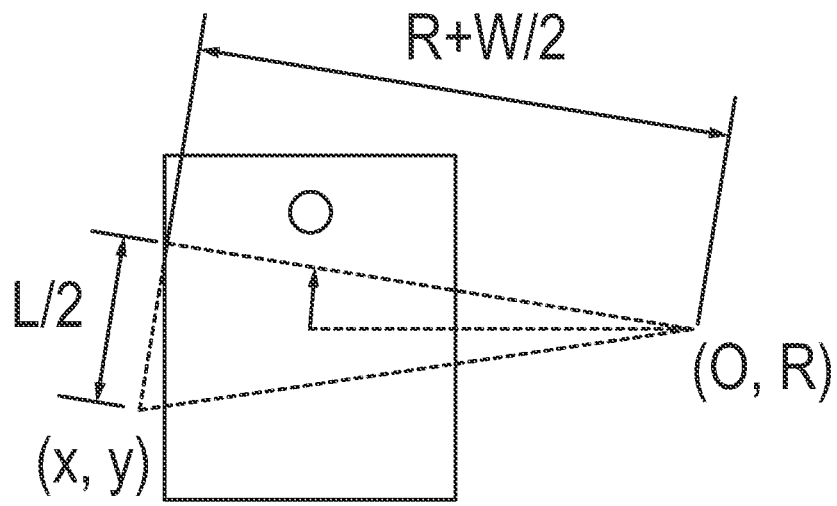
FIG. 8 shows the critical trajectory for a vehicle to avoid a hazard on its side behind its middle line showing the vehicle should avoid turning too much to the right to avoid a hazard in Zone III.

To avoid a hazard in Zone III or V, the vehicle should avoid turning too much to the opposite side. For example, if there is a hazard at (x, y) in Zone III, it is obviously safe for the vehicle to move forward or turn left, but it can only turn right slightly without hitting it. As depicted in FIG. 8, the critical right-turning trajectory in this scenario leads the vehicle to a position where its left-rear corner touches the hazard. The admissible curvature range in this case is found to be:

$$\tau \leq \frac{W + 2y}{d^2 - L_a^2}$$

Similarly, the admissible curvature range for a hazard (x, y) in Zone V is found to be:

$$\tau \geq \frac{-W + 2y}{d^2 - L_a^2}$$

For each hazard point detected in these five zones, a range of feasible curvatures is calculated by one of the five equations presented above. Then, those that may push the vehicle out of balance if it is on a slope or uneven terrain will be rejected. The intersection of all these filtered ranges determines the range of safe curvatures that the vehicle must follow in order to avoid all these hazards. Depending on the distribution of proximate hazards, the final range could be a union of two separate intervals, a single interval, or empty.

The commanded velocity of the vehicle depends on several factors including: vehicle state (for example actual velocity, rate of turn and attitude) and terrain type (e.g., roughness and inclination) and orientation of the vehicle with respect to the terrain slope or environmental features. Commanded velocity on the sloped terrain should be adjusted to ensure sufficient traction while avoiding slippage and overturning of the vehicle. This is achieved by measuring current vehicle attitude and terrain slope ahead of the vehicle. Different strategies may be used depending on the terrain and vehicle capabilities. For example, climbing stairs is safest when approaching the steps at the right angle.

Verifying the Safety of the Driving Commands Issued by a Driving Module

In one embodiment, the driving module is a person who controls the vehicle's motion by using a hand controller that is wirelessly interfaced with the vehicle. In a related embodiment, a person drives the car directly with the vehicle, controlling its speed, heading and rate of change of heading with the steering wheel, accelerator pedal and brake pedal. In another embodiment, the driving module is a computer system that runs a way-point following algorithm, causing the vehicle to track a path between the way-points. In each embodiment, the vehicle's driving command includes linear speed and turning rate, denoted by $v_c$ and $w_c$. If $\tau_c = w_c/v_c$ is within the admissible range found the preceding step, then the command pair $(v_c, w_c)$ is considered safe and should be passed the vehicle directly; otherwise they should be adjusted before being passed to the vehicle to ensure its safety.

Adjusting Unsafe Driving Commands

If a driving command pair $(v_c, w_c)$ is not within the admissible range, then it is considered unsafe and must be adjusted to conform with the admissible range. This step takes the command pair from said driving module and the admissible range of trajectory curvature as inputs. In addition, it explicitly considers the constraints on the vehicle's speed and turning rate to avoid generating infeasible or non-smooth motion commands which would be observed as interfering behavior to the operator. When a command pair $(v_c, w_c)$ is found outside the admissible range, the turning rate command is changed first within its admissible range. If the original speed command and the adjusted turning rate is not within the admissible range, the speed command is then adjusted within its admissible range. If changing both does not meet the admissible range, it indicates that no feasible solution exists. In this situation, the speed and turning rate commands are set to zero to stop the vehicle.

Those skilled in the art will appreciate that the present method and system may be used in both remotely driven or teleoperated vehicles as well as vehicles being directly driven by a person. In the teleoperated vehicle case, based on camera views of the scene in front of the remote vehicle, remote human drivers specify real-time driving command pairs $(v_c, w_c)$ through input devices like a gamepad or joystick type controller. In the case of a person driving a car, a human driver specifies and regulates a desired driving command pair $(v_c, w_c)$ by changing the steering wheel orientation, the rate of change of steering angle, as well as regulating speed through monitoring the speedometer and regulating the desired speed through the use of the accelerator and brake. In this invention, for the teleoperated case, the on-board vehicle on a real-time basis would replace the original remote driver's driving command pair $(v_c, w_c)$ with the admissible speed and turning rate commands. In the case of the car being directly driven by a person, where the instantaneous driving command pair $(v_c, w_c)$ is not safe, the admissible driving command would be applied through a speed control function like the vehicle's cruise control and the turning rate through a servo controller on the steering wheel, such as that described in U.S. Pat. No. 6,157,892 for the "turnability" increasing control operation.

Notify Driving Module of the Command Adjustment and Hazard Information

Figures 9A, 9B:
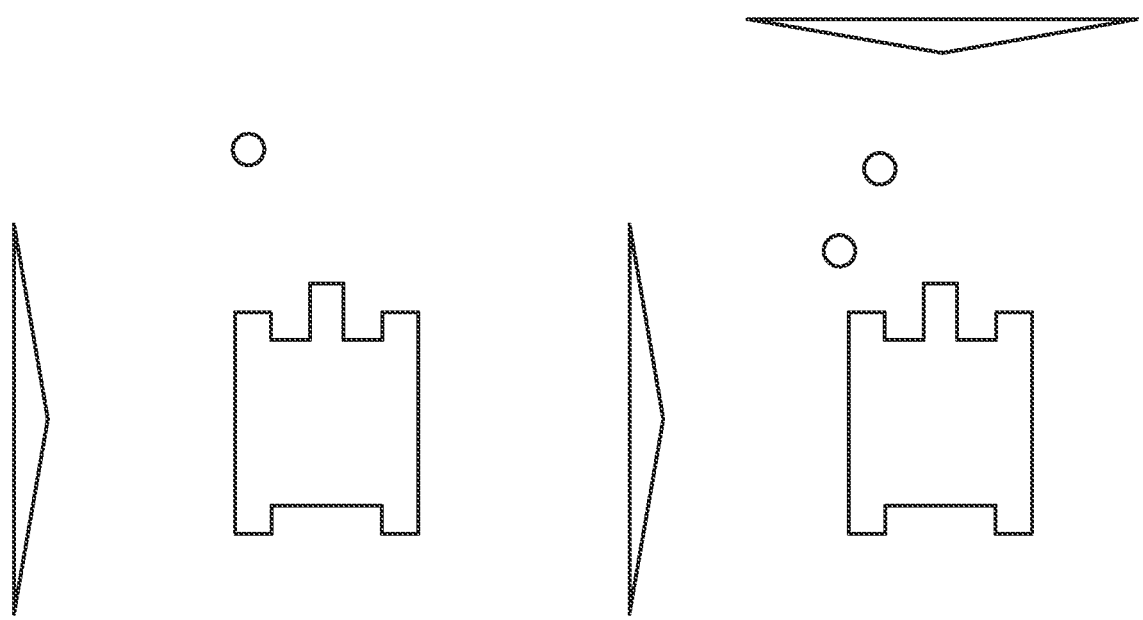
FIGS. 9(a) and 9(b) show a hazard visual waning signal for notifying a driving module of command adjustment.

In the case of a human-operated vehicle (teleoperated or driven directly by a person in the vehicle), the command adjustment is presented to warn the operator of the behavior of the hazard avoidance system. As shown in FIGS. 9(a) and 9(b), visual signals are provided to notify the operator the location of hazards when they are within critical distance and the effect of said hazard avoidance system. In another embodiment, audible cues are used as notifying signals. Specifically, a visual warning signal is used to notify a human operator of the behavior of the hazard avoidance system. In FIG. 9(a) the vehicle detects one hazard on its top-left corner. The triangle on its right side indicates that the hazard avoidance system is driving the vehicle to make a right turn in order to avoid it. In FIG. 9(b), the vehicle detects two hazards near it top-left corner. The triangle on its right side indicates that the hazard avoidance system is driving the vehicle to make a right turn in order to avoid them, and the triangle on its top indicates that the hazard avoidance system is slowing down the vehicle during the right turn.

The driving assistance system for a vehicle disclosed herein is very advantageous for its assistive and unobtrusive nature. This feature allows it to provide unobtrusive driving assistance to both human-operated and autonomous vehicles in avoiding both static and moving hazards.

It will be understood that the present method is a computer implemented method with the computer programmed with instructions to perform all the steps in as disclosed herein. A non-limiting exemplary computer system that may be used to implement the present method contains a central processor interfaced with a memory storage device, input/output devices and user interface(s), a power supply, an internal memory storage containing code for the various programs used to implement the present method with the computer system configured to accept the computer-readable media containing the instructions to implement the present method.

Thus, the present disclosure provides a computer implemented method of providing unobtrusive driving assistance to a vehicle to avoid and handle hazards, the vehicle having a computer, one or more positioning sensors connected to said computer, one or more rangefinder sensors connected to said computer, a driving module interfaced with said computer, said method comprising:
a) acquiring raw sensor data from said one or more positioning sensors and said one or more rangefinder sensors;
b) estimating a state of said vehicle from said raw data from said one or more positioning sensors;
c) identifying hazards to said vehicle from said raw data from said one or more rangefinder sensors;
d) computing a range of safe driving commands for all said hazards;
e) receiving driving commands from said driving module and comparing them with said range of safe driving commands; and
f) if said driving commands fall outside of said range of safe driving commands, adjusting said driving commands from said driving module and passing the adjusted driving commands to said vehicle, otherwise if said driving commands fall within said range of driving commands, passing said driving commands to said vehicle without modification.

The present disclosure provides a computer implemented method for calculating the range of safe driving commands for a vehicle to avoid detected hazards, comprising the steps of:
a) partitioning all detected hazards into multiple zones around said vehicle;
b) Identifying one or more critical points on said vehicle for each of said zones;
c) computing one critical trajectory for each of said critical points to avoid each hazard in the zone that is corresponding to said critical point;
d) calculating the curvature of each critical trajectory;
e) measuring the vehicle attitude and estimating its stability;
f) calculating the range of safe curvatures for each of said hazards with said range's boundaries defined by said critical trajectories; and
g) calculating the intersection all ranges of safe curvatures.

The present disclosure provides a computer implemented method for computing critical trajectories to avoid hazards in the vicinity of a vehicle, comprising the steps of:
d) partitioning all detected hazards into one or more zones around said vehicle;
e) identifying one or more critical points on said vehicle for each of said one or more zones; and
f) computing one critical trajectory for each of said critical points to avoid or handle each hazard in the zone that is corresponding to said critical point.

The foregoing description of the preferred embodiments of the disclosure has been presented to illustrate the principles of the disclosure and not to limit the disclosure to the particular embodiment illustrated. It is intended that the scope of the disclosure be defined by all of the embodiments encompassed within the following claims and their equivalents.

What is claimed is:

1. A method for calculating the range of safe driving commands for a vehicle to avoid detected hazards, comprising the steps of:
assigning each detected hazard into a zone around said vehicle so that each zone has a detected hazard located therein;
dynamically identifying one or more critical points on said vehicle such that each zone and its corresponding hazard is associated with said one or more critical points on said vehicle;
computing one critical trajectory for each of said one or more critical points to avoid the hazard in the zone that is corresponding to said critical point;
calculating the curvature of each critical trajectory;
measuring the vehicle attitude and estimating its stability;
calculating a range of safe curvatures for each of said zones containing a hazard; and
calculating the intersection of all ranges of safe curvatures.

2. The method according to claim 1 wherein the size of each zone is determined according to said vehicle's state and said hazards' distribution.

3. The method according to claim 1 wherein the step of measuring the vehicle attitude and estimating its stability is performed by calculating the position of the center of mass of said vehicle with respect to the contacting point between said vehicle and the ground along said critical trajectories.

4. A method for computing critical trajectories to avoid hazards in the vicinity of a vehicle, comprising the steps of:

assigning each detected hazard into a zone around said vehicle so that each zone has a detected hazard located therein;

dynamically identifying one or more critical points on said vehicle such that each zone and its corresponding hazard is associated with said one or more critical points on said vehicle;

identifying one or more critical points on said vehicle for each of said one or more zones; and computing one critical trajectory for each of said critical points to avoid or handle each hazard in the zone that is corresponding to said critical point.

5. The method according to claim 1 wherein the calculated intersection of all ranges of safe curvatures is used to select the route.

6. The method according to claim 1, wherein said vehicle is modelled as being rectangular.

* * * * *